United States Patent [19]
Ho et al.

[11] Patent Number: 5,883,619
[45] Date of Patent: Mar. 16, 1999

[54] COMPUTER MOUSE FOR SCROLLING A VIEW OF AN IMAGE

[75] Inventors: Heng-Chin Ho; Ming-Cheng Yang; Chih-Hsiung Wu, all of Taipei Hsien, Taiwan

[73] Assignee: Primax Electronics Ltd., Taiwan

[21] Appl. No.: 748,164

[22] Filed: Nov. 12, 1996

[51] Int. Cl.⁶ .................................................. G09G 5/08
[52] U.S. Cl. ........................ 345/163; 345/156; 345/157; 345/158; 345/123
[58] Field of Search ..................... 345/123, 157, 345/159, 160, 163, 164–168, 156, 973, 341, 321

[56] References Cited

U.S. PATENT DOCUMENTS

| | | | |
|---|---|---|---|
| 4,602,251 | 7/1986 | Sawada et al. | 345/123 |
| 4,654,647 | 3/1987 | Wedam | 345/160 |
| 5,512,920 | 4/1996 | Gibson | 345/163 |
| 5,530,455 | 6/1996 | Gillick et al. | 345/163 |

*Primary Examiner*—Jeffery A. Hofsass
*Assistant Examiner*—Julie B. Lieu
*Attorney, Agent, or Firm*—Winston Hsu

[57] ABSTRACT

A view control system for controlling the display of a view within an image over a computer monitor is disclosed. The system comprises a computer for displaying the view over the monitor and for scrolling the view within the image according to scrolling signals so that various portions of the image can be seen through the view, a computer mouse electrically connected to the computer through a flexible cable for controlling movements of a cursor displayed over the monitor, a view control button installed over the mouse for sensing a direction of a finger input and generating scrolling signals according to the sensed direction of the finger input and the length of time of each input to control the scrolling of the view within the image, and a bi-directional button installed over the mouse for generating a zooming signal within the scrolling signal for zooming in or out of the view within the image.

12 Claims, 2 Drawing Sheets

5,883,619

COMPUTER MOUSE FOR SCROLLING A VIEW OF AN IMAGE

BACKGROUND OF THE INVENTION

1. Field of the Invention

The present invention relates to a computer pointing device, and more particularly, to a computer mouse for scrolling a view of an image displayed over a computer monitor.

2. Description of the Prior Art

Window-based application interface has been commonly accepted by most computer users in today's computer world. When a window-based application displays an image over a computer monitor by using a window program, if the image is too big and can not be fit into a window which is displayed over the monitor by the window program, only a portion of the image will be displayed over the window and the window program will generate one or two scrolling bars over its right side or bottom side of the window for scrolling of the image within the window. The portion of the image displayed over the window is called a view and the scrolling bars are used to scroll the view of the image so that various portions of the image can be seen through the window.

U.S. Pat. No. 5,530,455, invented by Gillick et al, disclosed a computer mouse having a roller for scrolling the view of image over a computer monitor. The up and down scrolling of the view is controlled by rolling the roller forward or backward, and the lateral scrolling of the view is controlled by using both the roller and a shift key. The speed and amount of the scrolling of the view is in proportion to the speed and amount of roller's rotation. Several drawbacks have been discovered in using the roller of the mouse to control the view scrolling. First, frequent rolling of the roller may easily cause a soar finger if a task requires frequent rolling of the view. Second, when two dimensional view scrolling is required, a user has to constantly change the scrolling direction of the view which is quite inconvenient to a user. Third, both the up and down scrolling and the lateral scrolling are controlled by rolling the roller in forward and backward directions. If constant change is needed between the up and down scrolling and the lateral scrolling, a user has to constantly adapt himself for different control modes because the same forward or backward rolling of the roller will generate different scrolling action of the view which is quite difficult to a user.

SUMMARY OF THE INVENTION

It is therefore a primary objective of the present invention to provide a view control system which allows two dimensional view scrolling.

It is another objective of the present invention to provide a view control system which allows enlarging or shrinking of the view of an image.

Briefly, in a preferred embodiment, the present invention includes a view control system for controlling the display of a view within an image over a monitor, the view presenting a portion of the image, said system comprising:

(1) a computer connected to the monitor for displaying the view over the monitor and for scrolling the view within the image according to scrolling signals so that various portions of the image can be seen through the view;

(2) a pointing device electrically connected to the computer for controlling movements of a cursor displayed over the monitor by the computer;

(3) view control means installed over the pointing device for sensing a direction of a finger input from a user;

wherein the pointing device generates two dimensional scrolling signals according to the sensed direction of each finger input and wherein the view of the image is scrolled by the computer according to the scrolling signals received from the pointing device. The view control means comprises a sensor for sensing a two dimensional direction of the finger input and the pointing device comprises a control unit connected to the sensor for generating the two dimensional scrolling signals accordingly. The view control means further comprises a bi-directional button connected to the control unit for generating a zooming signal wherein the content of the view within the image is zoomed in or zoomed out by the computer upon receiving the zooming signal from the view control means.

It is an advantage of the present invention that the view control means of the view control system allows two dimensional view scrolling when scrolling a view of an image displayed over the monitor.

It is another advantage of the present invention that the view control means of the view control system provides a bi-directional button for zooming the view of an image.

These and other objects and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
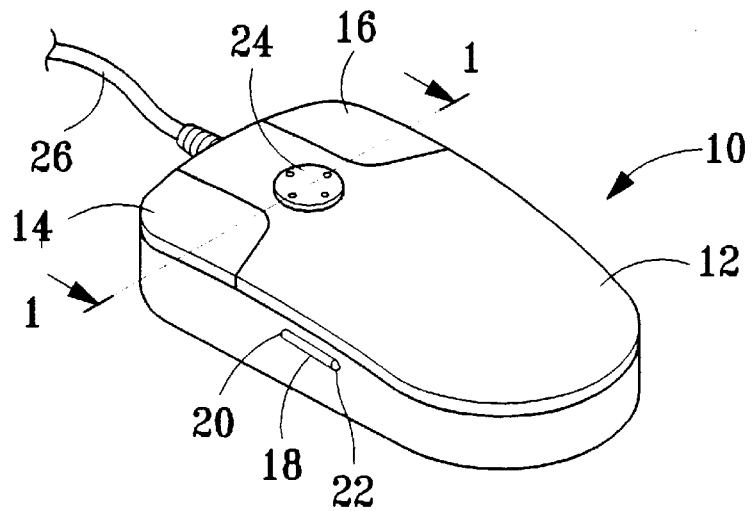
FIG. 1 is a perspective view of a computer mouse according to the present invention.

Please refer to FIG. 1. FIG. 1 is a perspective view of a computer mouse 10 according to the present invention. The mouse 10 comprises a housing 12, a left button 14 and a right button 16, a bi-directional button 18 which is depressible over its front end 20 for zooming in a view and its rear end 22 for zooming out a view, a view control button 24 installed over the mouse 10 which can be depressible toward various direction (two dimension) for sensing a two dimensional direction of a finger input from a user, a roller ball (not shown) installed on the bottom end of the housing 12, and a flexible cable 26 for connecting the mouse 10 to a host computer.

Figure 2:
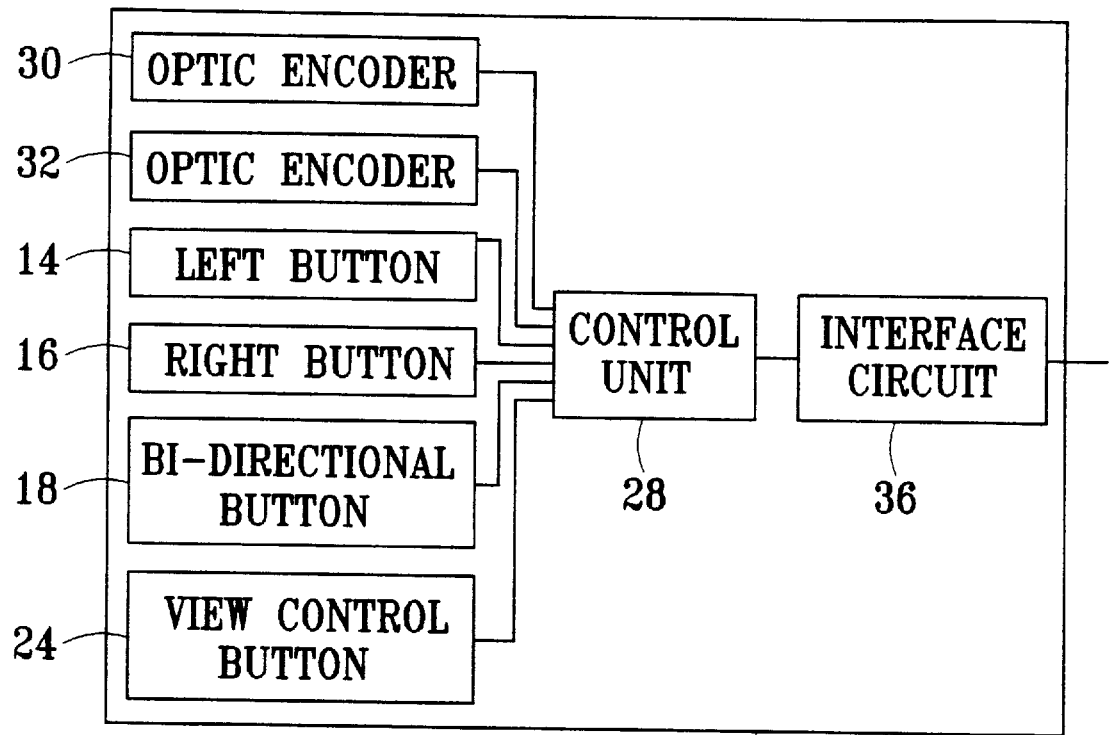
FIG. 2 is a block diagram of the computer mouse shown in FIG. 1.

FIG. 2 is a block diagram of the mouse 10 shown in FIG. 1. The mouse 10 comprises a control unit 28 connected to various input elements for constantly polling the input elements and generating digital input signals accordingly, and an interface circuit 36 connected to the control unit 28 for transmitting the digital input signals to a host computer and receiving control commands from the host computer. The input elements of the mouse 10 comprises two optic encoders 30 and 32 for converting rotations of the roller ball installed on the bottom end of the mouse 10 into digital input signals, a left button 14, a right button 16, a bi-directional button 18, and a view control button 24.

Figure 3:
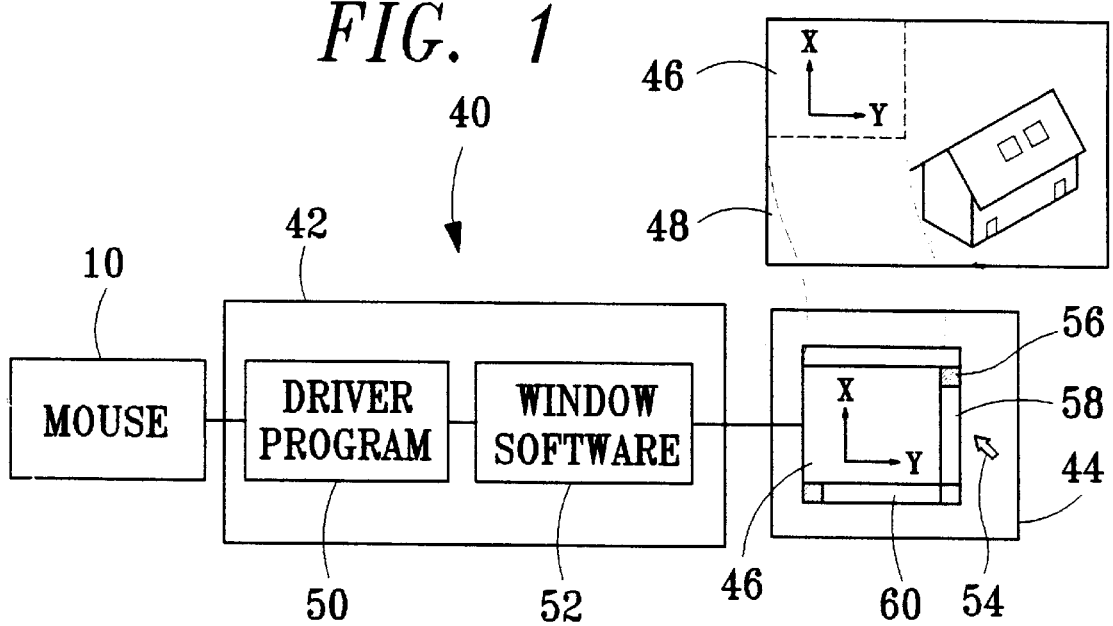
FIG. 3 is a block diagram of a view control system according to the present invention.

FIG. 3 is a block diagram of a view control system 40 according to the present invention. The view control system 40 comprises a computer 42 having a monitor 44 and a mouse 10. The view control system 40 is used for controlling the display of a view 46 within an image 48 over the monitor 44. The image 48 shows a two dimensional drawing stored in the computer 42 and the view 44 presents a portion (dotted area) of the image 48.

The computer 42 of the view control system 40 is used for displaying the view 46 over the monitor 44 and for scrolling the view 46 within the image 48 so that various portions of the image 48 can be seen through the view 46. The mouse 10 is electrically connected to the computer 42 for controlling movements of a cursor 54 displayed over the monitor 44 through the computer 42 by using the roller ball, the left key 14 and the right key 16 of the mouse 10, and also for generating scrolling signals to control the scrolling of the view 46 through the computer 42. The scrolling signals are generated by the control unit 28 of the mouse 10 according to the inputs from the view control button 24 and the bi-directional button 18 caused by finger inputs from a user to control the scrolling of the view 46 within the image 48 so that the view 46 of the image 48 can be scrolled by the computer 42 according to the scrolling signals received from the mouse 10.

The computer 42 comprises a window software 52 for displaying and scrolling the view 46 of the image 48 within a window frame 56 and a driver program 50 for receiving the scrolling signals from the mouse 10 and transmitting the scrolling signals to the window software 52. The window frame 56 comprises a vertical scrolling bar 58 and a horizontal scrolling bar 60 for scrolling the view 46 vertically or horizontally. The window software 52 comprises a plurality of service routines for providing various display control functions and at least one application for performing certain specific functions such as text or graphic editing over the content of the view 46 according to various user's inputs.

Figure 4:
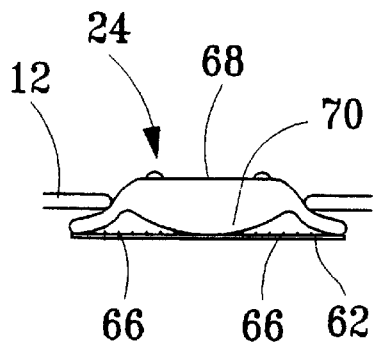
FIG. 4 is a sectional view 1—1 of the view control button shown in FIG. 1.
Figure 5:
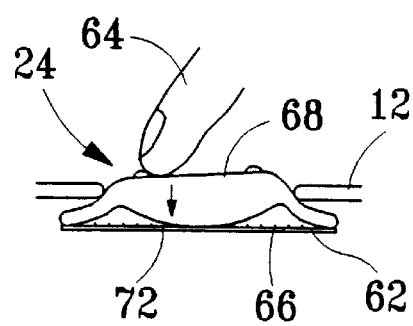
FIG. 5 is another sectional view of the view control button which is depressed by a finger toward one side.

FIG. 4 is a sectional view 1—1 of the view control button 24 shown in FIG. 1. FIG. 5 is another sectional view of the view control button 24 which is depressed by a finger 64 toward one side. The view control button 24 is used as a sensor for sensing a two dimensional direction of each finger input and generating two dimensional scrolling signals according to the sensed direction of each finger input.

The view control button 24 comprises a plurality of sensing elements 66 installed over a PCB board 68 of the mouse 10 for sensing the direction of each finger input and a touch pad 68 installed above the sensing elements 66 which can be tilted within a fixed angle toward various directions when receiving each finger input so that the movements of the touch pad 68 caused by each finger input can be sensed by the sensing elements 66 and converted into the scrolling signals by the mouse 10.

The sensing elements are made by electrically conductive strips organized in a concentric shape under the touch pad 68 which are electrically connected to the control unit 28. And the touch pad 68 comprises a flexible and electrically conductive convex side 70 for contacting the sensing elements 66. The sensing elements 66 can be used to measure the force exerted by the finger 64 or the tilted angle of the touch pad 68 caused by the finger 64. The force of each finger input is measured by sensing the number of sensing elements 66 contacted by the flexible convex side 70 and then converted into the scrolling signals by the control unit 28 of the mouse 10. And the tilted angle of each finger input can be measured by detecting the boundary sensing element 66 contacted by the touch pad 68 by the control unit 28.

Both the force or tilted angle measured by the sensing elements 66 can be used to control the scrolling speed of the view 46 within the image 48. FIG. 5 shows that the lower end of the flexible convex side 70 is deformed under the pressure of the finger 64 and a plurality of the sensing elements 66 are contacted by the flexible convex side 70 of the touch pad 68. The bigger the finger pressure from the finger 64, the more sensing elements are contacted by the flexible convex side 70. The boundary sensing element 72 contacted by the touch pad 68 is used for measuring the tilted angle of the touch pad 68 caused by the finger 64.

Each scrolling signal received by the driver program 50 comprises at least four parameters: $\triangle x$, $\triangle y$, $\triangle s$ and F. The two parameters ($\triangle x$, $\triangle y$) represent a normalized vector of a finger input's two dimensional direction. The length of the vector is always equal to 1 and the value of the $\triangle x$ or $\triangle y$ parameter is between −1 and +1. The $\triangle s$ parameter is a zooming parameter which represents either the front end 20 (zooming in) of the bi-directional button 18 is being pressed ($\triangle s=1$) or the rear end 22 (zooming out) is being pressed ($\triangle s=-1$) by a user. The F parameter represents either the force exerted by a finger input or the tilted angle caused by a finger input. If there is no finger input over the view control button 24, the $\triangle x$, $\triangle y$ and F parameters will all be 0. And if the bi-directional button 18 is not being pressed, the $\triangle s$ parameter will also be 0. Each scrolling signal is generated in a predetermined time interval (resolution) by the mouse for each finger input so that the longer the finger input is sensed by the view control button 24, the more scrolling signals which carry information about each finger input are generated by the mouse 10. And the window software 52 will respond to each received scrolling signal.

Figures 6, 7:
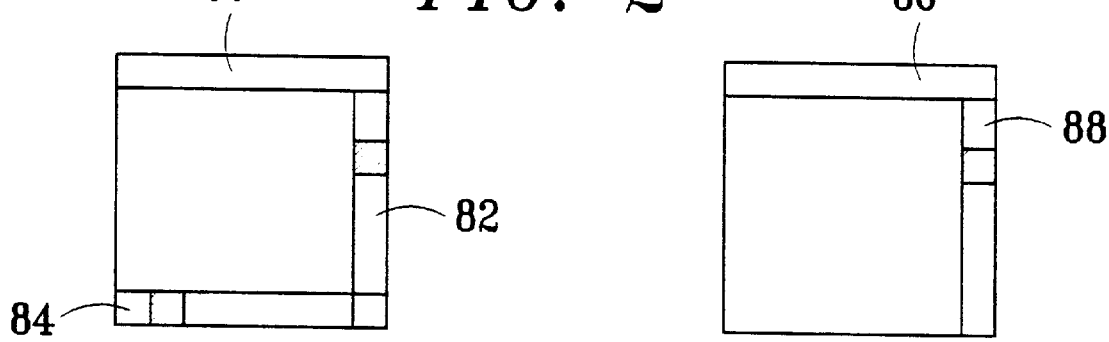
FIG. 6 shows a window frame which comprises two scrolling bars.
FIG. 7 shows a window frame which comprises a vertical scrolling bar.
Figure 8:
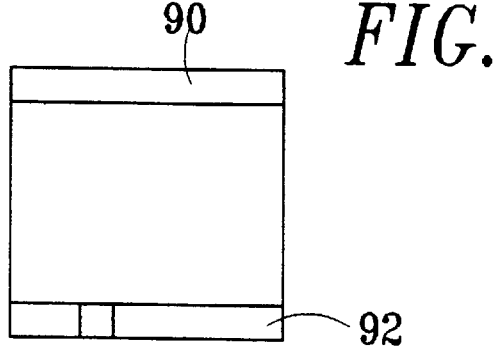
FIG. 8 shows a window frame which comprises a horizontal scrolling bar.

Please refer to FIGS. 6 to 8. When displaying a view of an image, the window software 52 will automatically generate one or two scrolling bars depending on the size of the view related to the size of the image. If the vertical size and horizontal size are both bigger than the correspondent sizes of the view displayed over a monitor, both the vertical and horizontal scrolling bars will be displayed on the right side and bottom side of a window frame by the window software 52 such as the window frame 80 shown in FIG. 6. FIG. 6 shows a window frame 80 which comprises a vertical scrolling bar 82 and a horizontal scrolling bar 84 generated by the window software 52. In this situation, the window software 52 will respond to each of the parameters of one scrolling signal. That means, if the $\triangle x$, $\triangle y$ and F parameters are generated by pressing the view control button 24, the window software 52 will scroll the view of the image toward the direction ($\triangle x$, $\triangle y$) in a speed proportional to the F parameter. And if the bi-directional button 18 is being pressed, the window software 52 will zoom in or zoom out the content of the view according to the $\triangle s$ parameter until a predetermined boundary condition or limit is reached.

On the other hand, if only one size of the image is bigger than the correspondent size of the view, only one scrolling bar will be generated by the window software 52. FIG. 7 shows a window frame 86 which comprises a vertical scrolling bar 88 and FIG. 8 shows a window frame 90 which comprises a horizontal scrolling bar 84 generated by the window software 52. In these situations, the window software 52 will respond differently to each scrolling signal received from the mouse 10.

In FIG. 7, since only the vertical scrolling bar 88 is presented, there is no need for the window software 52 to scroll the view horizontally even if the △y parameter is presented. The z,1 y parameter will be ignored in this situation. And the z,1 s parameter may also be treated differently in this situation. The window software 52 can perform a zooming function along both the vertical and horizontal directions such as in editing a graphic image, or only perform a zooming function along the vertical direction such as in editing a text image, or the window software 52 can simply disable the zooming function and only allow view scrolling function in this situation. A window-based application program developer can decide which options should be offer to a user for each specific application. In FIG. 8, only the horizontal scrolling bar 92 is presented and the window software 52 will scroll the view horizontally according to the △y parameter. The z,1 x parameter will be ignored in this situation.

A preferred process executed by the window software 52 is presented below. It shows how the window software 52 responds to one scrolling signal in various situations according to the above discussion. The view displayed by the window software 52 is treated as a graphic image in this process and the zooming function is always performed to both the vertical and horizontal dimensions according to the △s parameter no matter how many scrolling bars are presented by the window software 52.

step 1. receive a scrolling signal from the driver program 50;
step 2. check if the bi-directional button 18 is pressed; go to step (4) if no;
step 3. zoom in or zoom out the content of the view according to the △s parameter;
step 4. check if the view control button 24 is pressed; go to step (9) if no;
step 5. if only the vertical scrolling bar is presented in the window frame, set △dy=0 and calculate a moving distance △dx of the view over the image which is proportional to the △x and F parameters; go to step (8);
step 6. if only the horizontal scrolling bar is presented in the window frame, set △dx=0 and calculate a moving distance △dy of the view over the image which is proportional to the △y and F parameters; go to step (8);
step 7. if both vertical and horizontal scrolling bars are presented in the window frame, calculate a moving distance △dx and △dy of the view over the image which are proportional to the △x, △y and F parameters;
step 8. scroll the view according to the moving distances △dx and △dy over the image and display a new view of the image over the monitor 44;
step 9. terminate the process.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A view control system for controlling the display of a view within an image over a monitor, the view presenting a portion of the image, said system comprising:

a. a computer connected to the monitor for displaying the view over the monitor and for scrolling the view within the image according to scrolling signals so that various portions of the image can be seen through the view;
b. a pointing device electrically connected to the computer for controlling movements of a cursor displayed over the monitor by the computer;
c. view control means having a sensor installed over the pointing device, the sensor comprising:
 (1) a plurality of sensing elements for sensing a two dimensional direction of a finger input from a user; and
 (2) a touch pad having a flexible convex side installed above the sensing elements for contacting the sensing elements which can be tilted within a fixed angle toward various directions when receiving each finger input wherein the movements of the touch pad caused by each finger input are sensed by the sensing elements and wherein the force of each finger input is measured by sensing the number of sensing elements contacted by the flexible convex side and converted into the scrolling signals by the pointing device;

wherein the pointing device generates two dimensional scrolling signals according to the sensed two dimensional direction of each finger input and wherein the view is scrolled within the image along two mutually orthogonal directions by the computer according to the two dimensional scrolling signals received from the pointing device.

2. The view control system of claim 1 wherein the pointing device comprises a control unit connected to the sensor for generating the two dimensional scrolling signals accordingly.

3. The view control system of claim 2 wherein the pointing device generates each of the scrolling signals in a predetermined time interval when the finger input is being sensed by the sensor.

4. The view control system of claim 2 wherein the view control means further comprises a bi-directional button connected to the control unit for generating a zooming signal wherein the content of the view within the image is zoomed in or zoomed out by the computer upon receiving the zooming signal from the view control means.

5. The view control system of claim 1 wherein the speed in scrolling the view of the image by the computer is proportional to the force sensed by the sensing elements.

6. The view control system of claim 1 wherein the computer comprises a window software for displaying and scrolling the view of the image according to the scrolling signals and a driver program for receiving the scrolling signals from the pointing device and transmitting the scrolling signals to the window software.

7. The view control system of claim 6 wherein each of the two dimensional scrolling signals comprises two parameters representing the sensed two dimensional direction of each finger input, and the two parameters are used by the window software for scrolling the view within the image along two mutually orthogonal dimensions separately.

8. The view control system of claim 6 wherein each of the two dimensional scrolling signals comprises two parameters representing the sensed two dimensional direction of each finger input, and the two parameters are used by the window software for scrolling the view within the image along two mutually orthogonal dimensions separately; and wherein if the view is restricted to scroll within the image along only one of the two dimensions by the window software, the window software will scroll the view along said dimension according to one corresponding parameter of said dimension and ignore the other parameter.

9. The view control system of claim 1 the pointing device is connected to the computer through a flexible cable.

10. The view control system of claim 1 wherein the pointing device is a computer mouse.

11. A view control system for controlling the display of a view within an image over a monitor, the view presenting a portion of the image, said system comprising:
   a. a computer connected to the monitor for displaying the view over the monitor and for scrolling the view within the image according to scrolling signals so that various portions of the image can be seen through the view;
   b. a pointing device electrically connected to the computer for controlling movements of a cursor displayed over the monitor by the computer;
   c. view control means having a sensor installed over the pointing device, the sensor comprising:
      (1) a plurality of sensing elements for sensing a two dimensional direction of a finger input from a user; and
      (2) a touch pad having a flexible convex side installed above the sensing elements for contacting the sensing elements which can be tilted within a fixed angle toward various directions when receiving each finger input wherein the movements of the touch pad caused by each finger input are sensed by the sensing elements and wherein the tilted angle of each finger input is measured by detecting a boundary sensing element contacted by the flexible convex side and converted into the scrolling signals by the pointing device;

wherein the pointing device generates two dimensional scrolling signals according to the sensed two dimensional direction of each finger input and wherein the view is scrolled within the image along two mutually orthogonal directions by the computer according to the two dimensional scrolling signals received from the pointing device.

12. The view control system of claim 11 wherein the speed in scrolling the view of the image by the computer is proportional to the titled angle of the touch pad sensed by the sensing elements.

* * * * *